(12) United States Patent
Douglas

(10) Patent No.: US 11,153,675 B1
(45) Date of Patent: Oct. 19, 2021

(54) WIRELESS HIGH-FIDELITY MESH NETWORK AUDIO TRANSMISSION SYSTEM

(71) Applicant: Steve A. Douglas, Port Saint Lucie, FL (US)

(72) Inventor: Steve A. Douglas, Port Saint Lucie, FL (US)

(73) Assignee: Steve A. Douglas, Port Saint Lucie, FL (US)

( * ) Notice: Subject to any disclaimer, the term of this patent is extended or adjusted under 35 U.S.C. 154(b) by 0 days.

(21) Appl. No.: 16/842,644

(22) Filed: Apr. 7, 2020

(51) Int. Cl.
| | |
|---|---|
| *H04R 1/10* | (2006.01) |
| *H04W 76/10* | (2018.01) |
| *H04W 4/80* | (2018.01) |
| *H04W 84/18* | (2009.01) |

(52) U.S. Cl.
CPC ............ *H04R 1/1041* (2013.01); *H04W 4/80* (2018.02); *H04W 76/10* (2018.02); *H04R 2420/07* (2013.01); *H04W 84/18* (2013.01)

(58) Field of Classification Search
CPC ....................................................... H04R 1/10
See application file for complete search history.

(56) References Cited

U.S. PATENT DOCUMENTS

| | | | | |
|---|---|---|---|---|
| 8,433,243 | B2* | 4/2013 | Sharma | H04R 5/033 455/41.2 |
| 2008/0152160 | A1* | 6/2008 | Chew | H04H 20/61 381/71.6 |
| 2009/0222863 | A1* | 9/2009 | Lin | H04N 21/43637 725/81 |

* cited by examiner

*Primary Examiner* — Olisa Anwah

(57) ABSTRACT

A wireless high-fidelity mesh network audio transmission system that establishes a mesh network of members devices for the transmission of an audio signal to a scalable quantity of listeners simultaneously with low latency, high definition, and individualized volume control.

5 Claims, 5 Drawing Sheets

WIRELESS HIGH-FIDELITY MESH NETWORK AUDIO TRANSMISSION SYSTEM

CROSS-REFERENCE TO RELATED APPLICATIONS

This application claims the benefit of Applicants' prior provisional application, No. 62/830,921, filed on Apr. 8, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates generally to audio transmission systems and more specifically it relates to a wireless high-fidelity mesh network audio transmission system for the transmission of audio signal from a source to a large number of individual audience member devices configured to establish a mesh network whereby the audio signal is further transmitted between member devices until it has reached all member devices in range.

There are many indoor and outdoor venues in which an audio source, for example a speaker or musician, is generating audible sound which is intended to be heard by an audience of listeners. The further away a listener is from the source of the audio, the more difficult it is for the listener to hear the audio clearly.

Amplification systems are often used in such settings to increase the amplitude of the audio source so that it can be heard by listeners at a greater distance. As per the inverse square law, the sound intensity generated by amplification systems becomes more diffuse as the distance between the listener and the amplification source increases. Therefore, in large venues listeners positioned at greater distance from the amplification source do not hear the audio as clearly as those positioned at a lesser distance from the amplification source.

Another issue with audibility in indoor and outdoor venues is that the sound generated by amplification systems reflects off of surfaces in the area in which the amplification source is placed. This creates reverberation which causes diminished articulation of the amplified sound.

Amplification systems which increase amplitude also increase the decibel level to which listeners are exposed. The larger the venue, the higher the amplitude necessary to reach all listeners. A common symphony or band concert reaches decibel levels in excess of 100 dB. Continued exposure to decibel levels above 85 dB can contribute to hearing damage.

Transmitting the audio source to an individual listener via an individual listening device such as headphones provides the necessary amplification without diffusion, loss of clarity, or reverberation. This also allows the listener to control the volume of audio within their headphones, thus controlling their relative decibel level exposure. Indoor and outdoor venues do not consistently support wired listening apparatuses whereby listeners can plug headphones directly into an audio source. This requires hard wiring throughout the venue with headphone jacks compatible with all types of headphone plugs which is both cost prohibitive and logistically impractical for venues which are outdoors, accommodate audiences of hundreds or thousands of people, and/or do not have seating infrastructure which supports such a configuration. There exists methods of audio transmission to listeners' headphones via Bluetooth™ piconet, however this form of wireless transmission is limited in range to 10 meters between master and slave device (source and listener, respectively) and requires one master Bluetooth™ transmission device for every seven active slave devices within radio range. There exists methods of simultaneous audio transmission to multiple users with devices connected to the broadcast via cellular data connection or wireless internet connection and which allows users to plug headphones into the connected device. However, this method of transmission is contingent upon a connection to a cellular data or wireless internet source which commonly weaken in signal strength, are rendered inactive, and/or experience buffering and delayed transmission when a plurality of devices access the cellular data or internet source simultaneously, as they would with many audience members in a single venue.

Hence, there is a need for a wireless high-fidelity mesh network audio transmission system which not only transmits the audio source in indoor and outdoor venues to listeners in a manner which provides the necessary amplification without diffusion, loss of clarity, or reverberation, but also utilizes member devices as a mode of transmission of audio signal to other member devices within the venue to scale transmission to listening audiences of all sizes, provides amplification with the ability to control decibel level, and is compatible with all manner of venue configurations.

2. Description of Related Art

In the art of audio signal transmission many different types of hardwired and wireless methods have been developed for carrying and amplifying audio signal from a source to a group of listeners. Top audio transmission methods include amplification through a network of speakers, AM/FM radio wave transmission, internet streaming, and Bluetooth™ piconet transmission.

One problem with transmission via hardwired speaker amplification is that the decibel level of the audio output must be increased as the size of the venue and/or audience increases in order to be heard. This is associated with temporary and permanent hearing damage. Another limitation of speaker amplification is that the sound waves are subject to diffusion, echo, and reverberation which can reduce the integrity and clarity of the audio signal.

An issue with AM/FM audio transmission is that there is a latency from milliseconds to several seconds between the audio source and the corresponding audio signal reaching the listener. Receiving AM/FM signal also requires a device that is enabled to receive radio frequencies, which many modern digital devices lack.

Audio transmission via wireless internet or cellular data connection is dependent upon the availability and accessibility of a connection for all listeners. Another problem with wireless internet and cellular data audio transmission is that as more listeners access the signal, the signal weakens. This can lead to connection failure, latency, and dropped signal.

Bluetooth™ piconet is limited in range to approximately 10 meters between the master and slave devices. Bluetooth™ piconet is also limited to approximately seven active slave devices to every one master device. Additionally, Bluetooth™ piconet devices can either send or receive signal, but cannot do both actions simultaneously.

Therefore, what is clearly needed is a wireless audio transmission mechanism that solves the problems mentioned above.

BRIEF SUMMARY OF THE INVENTION

In view of the foregoing disadvantages inherent in the known types of audio transmission devices now present in the prior art, the present invention provides a new wireless high-fidelity mesh network audio transmission system whereby the same can be utilized for transmitting the audio source with high sonic clarity and low latency to a scalable quantity of listeners simultaneously while providing individual volume control in indoor and outdoor venues of all sizes.

The general purpose of the present invention, which will be subsequently described in greater detail, is to provide a new wireless high-fidelity mesh network audio transmission system that has many of the advantages of the audio transmission systems mentioned heretofore and many novel features which are not anticipated, rendered obvious, suggested, or even implied by any of the prior art audio transmission systems, either alone or in any combination thereof.

To attain this, the present invention generally comprises a root node to convert the source audio into a digital audio signal and a mesh network of member devices which receive and process the audio signal into the listeners' headphones while simultaneously transmitting the audio signal to other member devices within the mesh network.

A root node is hardwire connected to the source of audio to be amplified to listeners in the venue. The root node converts the source audio into a digital audio signal and transmits it wirelessly to member devices within the mesh network nearest to the root node.

Member devices are defined as a configuration of a mesh network transceiver, a digital-to-analog converter, a chipset for processing the incoming and outgoing data, and a headphone jack, housed in an encasement. The member device may be assembled and encased as a standalone device or assembled and encased within a personal electronic device with other uses and applications. Examples of personal electronic devices which may encase a member device includes but is not limited to a smartphone or personal computing device. Listeners may have their own member device, or the member device may be provided by or at the venue.

Member devices serve as receiver and transmitter ("transceiver"), processing the digital audio signal to analog audio signal for the user of the individual using the member device to listen in headphones connected to said device while simultaneously transmitting the digital audio signal to other member device(s) configured with transceivers within the mesh network.

Each member device is capable of transmitting the audio signal to multiple other member devices within the network. This configuration establishes the wireless high-fidelity mesh network audio transmission system throughout a venue with low latency, high definition, and individual volume control in which the member devices connect directly and non-hierarchically to as many other member devices as possible and communicate with one another to efficiently route audio signal to all in-network member devices. Therefore, as the quantity of member devices increases, the signal strength and availability of the mesh network is sustained.

In this respect, before explaining at least one embodiment of the invention in detail, it is to be understood that the invention is not limited in its application to the details of construction, to the placement position of the root node or member devices in or around a venue, and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a wireless high-fidelity mesh network audio transmission system that will overcome the shortcomings of the prior art devices.

A second object is to establish a wireless high-fidelity mesh network audio transmission system of member devices that enables long-range transmission of a digital audio signal without the necessity for multiple root nodes.

Another object of the invention is to establish a wireless high-fidelity mesh network audio transmission system comprised of a scalable quantity of member devices capable of receiving and transmitting the audio signal, which, when increasing in quantity, strengthens instead of weakens the wireless signal, providing a network that is scalable for large and small venues and audiences and a more stable network of wireless audio transmission than prior art devices.

A further object is to establish a wireless high-fidelity mesh network audio transmission system comprised of member devices that provides a simultaneous audio transmission that reduces distortion, echo, delay, and latency which commonly occur in venues due to listener position at variable distances from the audio amplification source.

Another object is to provide a wireless high-fidelity mesh network audio transmission system that allows listeners to control the volume of the audio signal in the headphones connected to their member device to reduce exposure to high decibel levels.

A further object is to provide a wireless high-fidelity mesh network audio transmission system that can function independently of a mobile application or program so that use is not limited to the owners of a particular brand or model of device capable of installing and operating such an application or program.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE SEVERAL VIEWS OF THE DRAWINGS

Various other objects, features and attendant advantages of the present invention will become fully appreciated as the same becomes better understood when considered in conjunction with the accompanying drawings, in which like reference characters designate the same or similar parts throughout the several views and wherein.

DRAWINGS—REFERENCE NUMERALS

2—Audio Source
4—Mixing Board
6—S/PDIF Audio Cable
8—3.5 mm Audio Cable
10—Root Node Device
12—Mesh Network Transceiver
16—Chipset
18—Charging Port
20—Battery
22—S/PDIF Audio Input Port
24—3.5 mm Audio Input Port
26—Indicator Light
28—Encasement
29—Charging Cable
30—Member Device
30A—Member Device
30B—Member Device
32—Motherboard
34—Mesh Network Transceiver
38—Chipset
40—Micro SD slot
42—Charging Port
46—Volume Control Button
48—Indicator Light
50—Battery
52—Micro SD Card
54—Digital-to-Analog Converter
56—Line Out Stereo Audio Jack
60—Encasement
61—Charging Cable
62—Headphones with Audio Cable
62A—Headphones with Audio Cable
62B—Headphones with Audio Cable

DETAILED DESCRIPTION OF THE INVENTION

The inventor provides a unique wireless high-fidelity mesh network audio transmission system for transmitting audio signal, enabling multiple audience members to listen to an audio source simultaneously with enhanced sonic quality and control of decibel exposure. The present invention is described in enabling detail in the following examples, which may represent more than one embodiment of the present invention.

Figure 1:
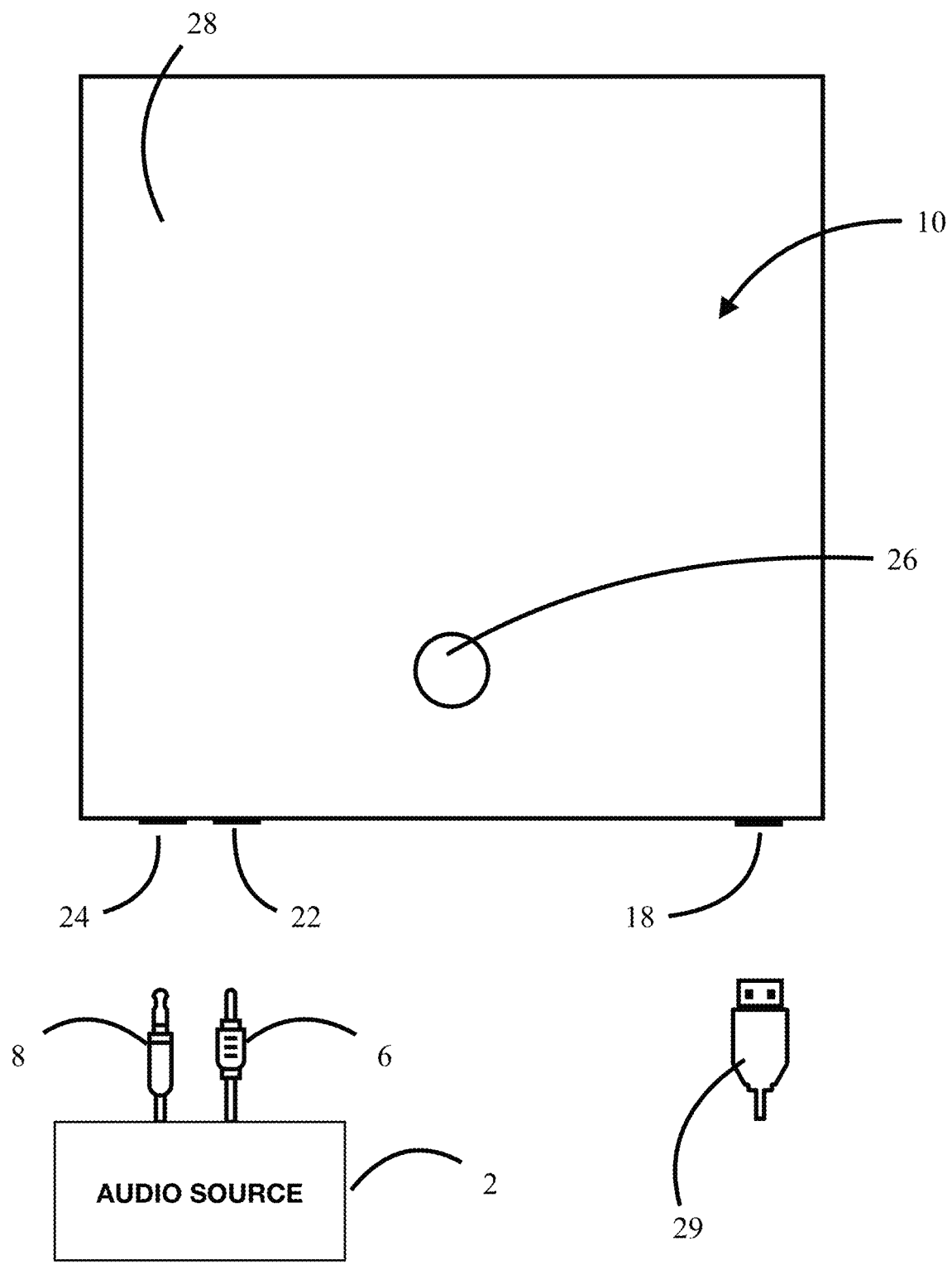
FIG. 1 depicts an upper perspective view of a root node device of the present invention.

FIG. 1 Depicts a perspective view of a Root Node Device 10 according to an embodiment of the present invention. The components of Root Node 10 in this example are contained within an Encasement 28. A Charging Cable 29 connects to a Charging Port 18 to power the device. An Indicator Light 26 illuminates to indicate an active connection to a power source and/or incoming audio signal in this example. The analog audio signal from an Audio Source 2 is transmitted to the Root Node Device 10 using an S/PDIF Audio Cable 6 connected to an S/PDIF Audio Input Port 22, or a 3.5 mm Audio Cable 8 connected to a 3.5 mm Audio Input Port 24 in this example.

Figure 2:
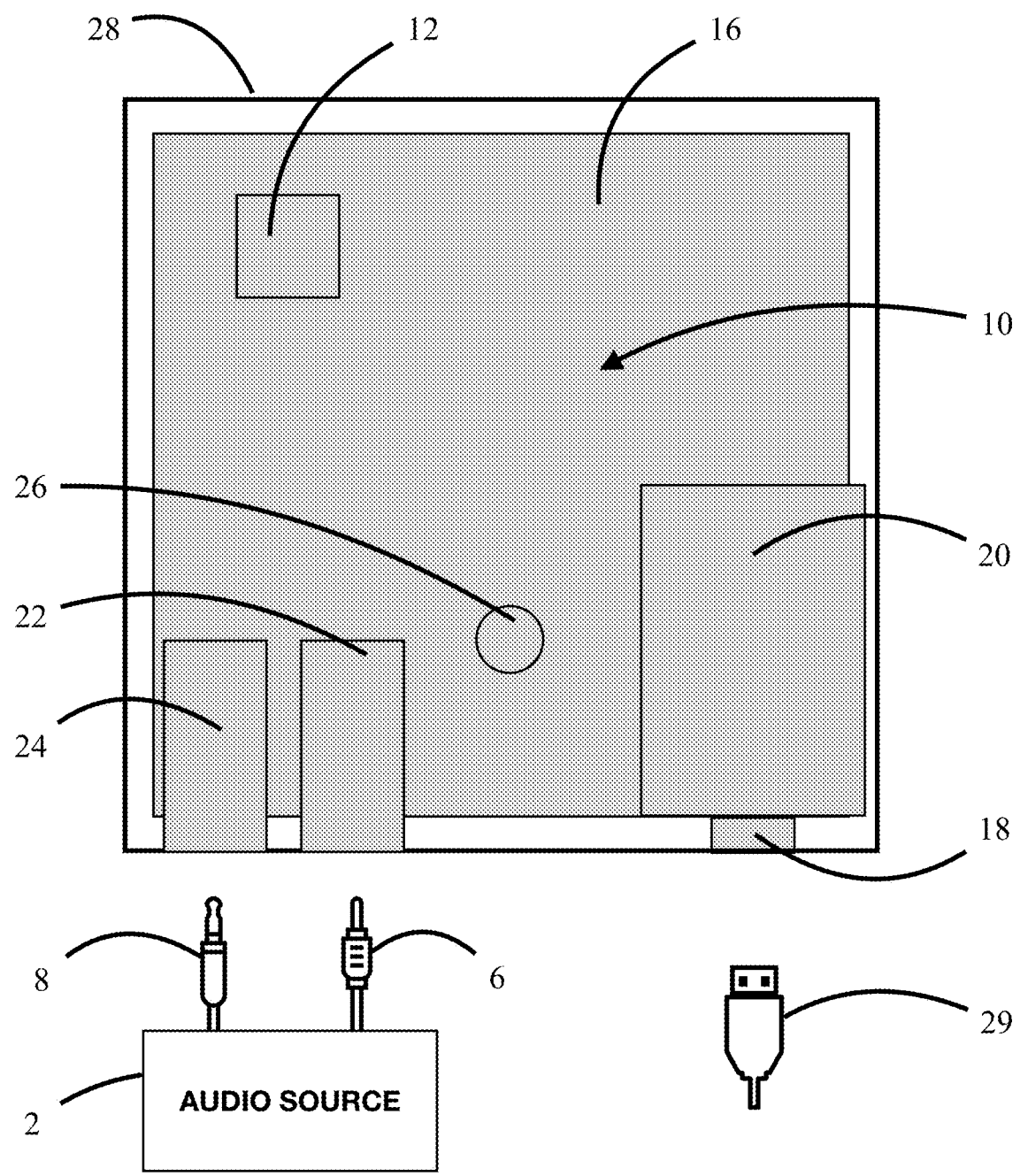
FIG. 2 depicts an upper perspective view of the configuration of internal components encased within a root node device of the present invention.

FIG. 2 Depicts a perspective view of the configuration of internal components in the Root Node Device 10 according to an embodiment of the present invention. FIG. 2 includes many of the same components introduced in FIG. 1 above. Those components that are unchanged in this embodiment retain their original element numbers and are not reintroduced. The components of the Root Node Device 10 in this example are contained within the Encasement 28. The Charging Cable 29 connects to the Charging Port 18 to power the device by charging the Battery 20. The Indicator Light 26 illuminates to indicate an active connection to a power source and/or incoming audio signal in this example. The analog audio signal from the Audio Source 2 in this example is transmitted to the Root Node device using the S/PDIF Audio Cable 6 connected to the S/PDIF Audio Input Port 22, or the 3.5 mm Audio Cable 8 connected to the 3.5 mm Audio Input Port 24. The conversion of the audio signal from analog to digital is processed by a Chipset 16. Chipset 16 transmits the digital audio signal to the Mesh Network Transceiver 12. The Mesh Network Transceiver 12 transmits the audio signal wirelessly to the Member Device(s) within range in this example.

Figure 3:
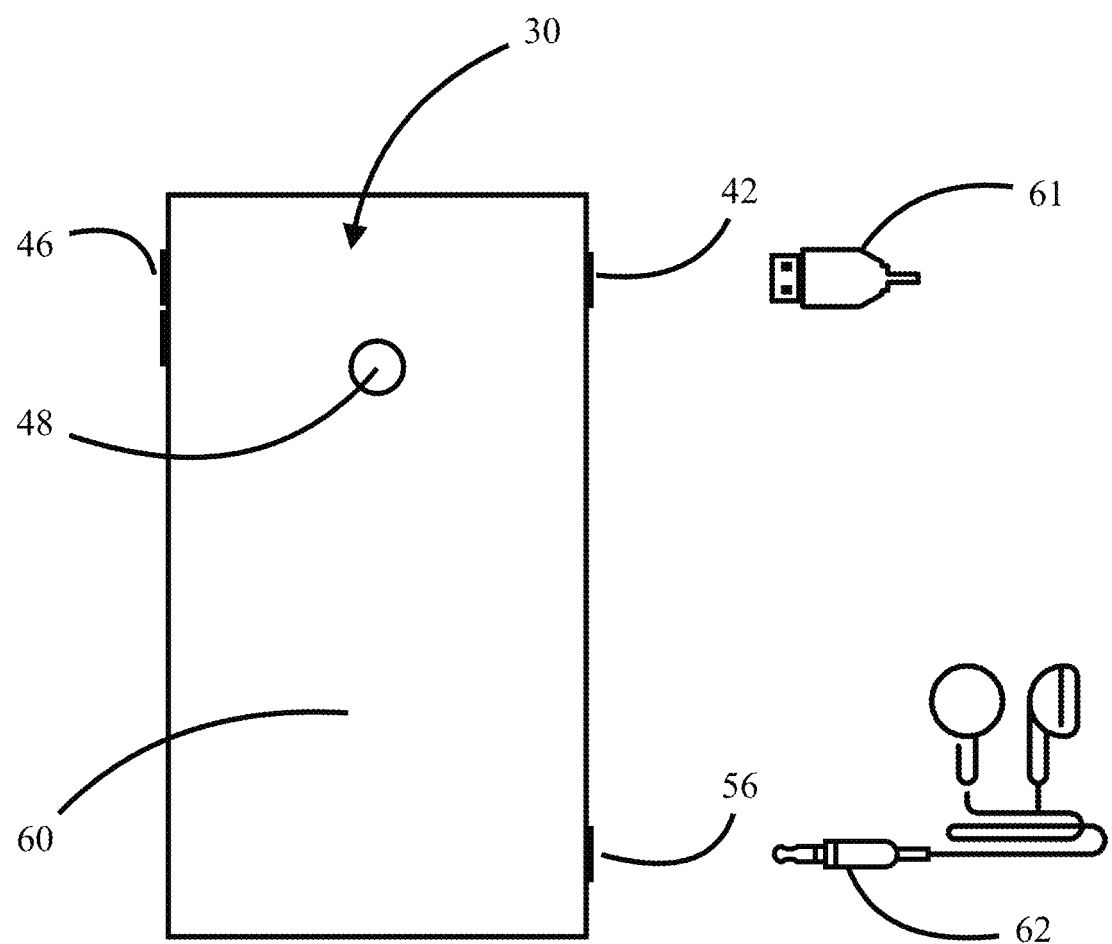
FIG. 3 depicts an upper perspective view of a member device of the present invention.

FIG. 3 Depicts a perspective view of a Member Device 30 according to an embodiment of the present invention. The components of the Member Device 30 in this example are contained within an Encasement 60. A Charging Cable 61 connects to a Charging Port 42 to charge the device in this example. An Indicator Light 48 illuminates to indicate an active connection to a power source and/or incoming audio signal in this example. A Headphones with Audio Cable 62 in this example connects with a Line Out Stereo Audio Jack 56 to allow the individual in possession of the device to listen to the audio signal. A Volume Control Button 46 in this example allows the individual in possession of the device to adjust the decibel level of the audio signal emitted from Headphones with Audio Cable 62.

Figure 4:
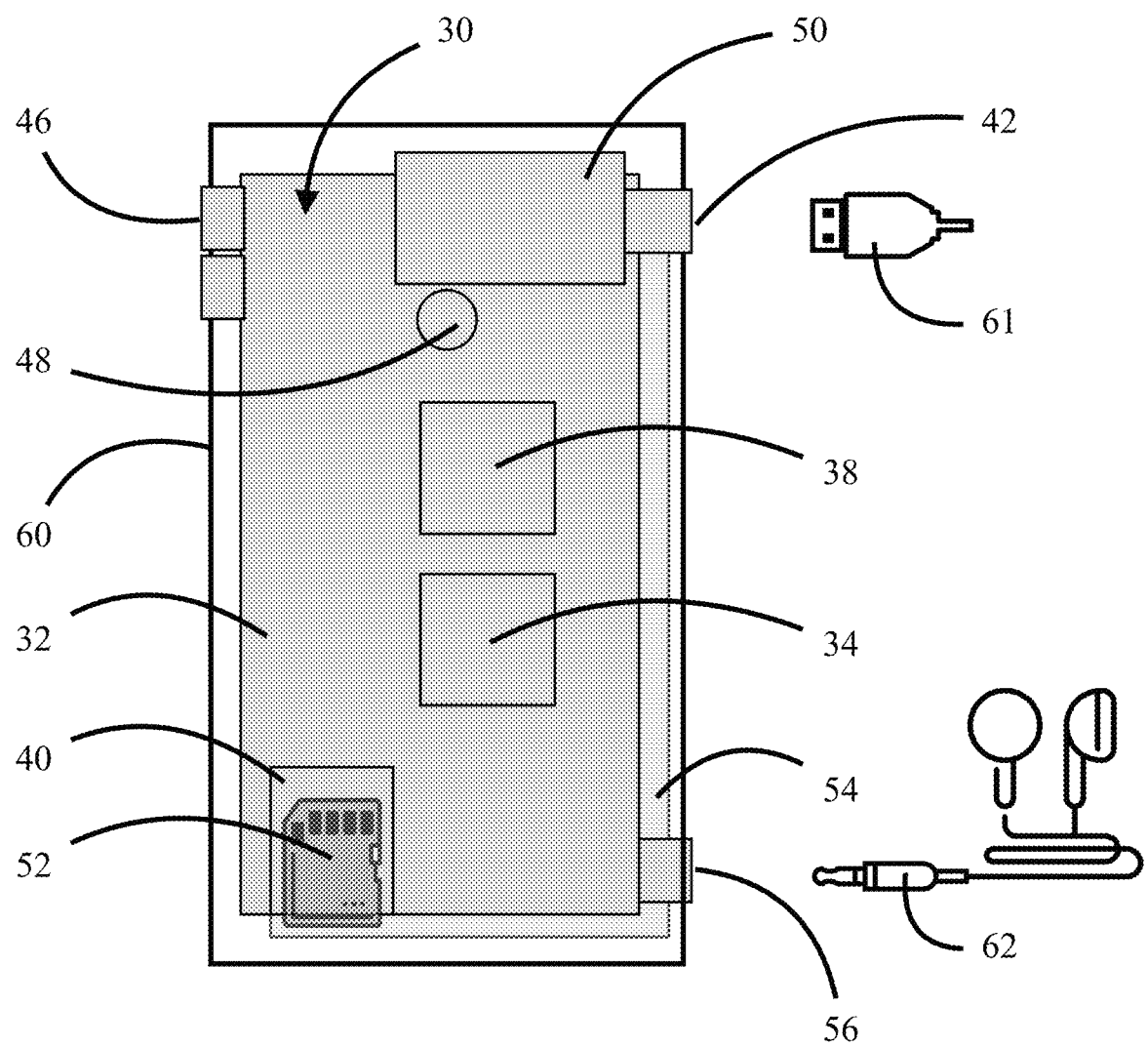
FIG. 4 depicts an upper perspective view of the configuration of internal components encased within a member device of the present invention.

FIG. 4 Depicts a perspective view of the configuration of internal components in the Member Device 30 according to an embodiment of the present invention. FIG. 4 includes many of the same components introduced in FIG. 3 above. Those components that are unchanged in this embodiment retain their original element numbers and are not reintroduced. The components of the Member Device 30 in this example are contained within the Encasement 60. The Charging Cable 61 connects to the Charging Port 42 to power the device by charging a Battery 50 in this example. The Indicator Light 48 illuminates to indicate an active connection to a power source and/or incoming audio signal in this example. A Mesh Network Transceiver 34 receives the digital audio signal from the Root Node or another Member Device. The Mesh Network Transceiver 34 receives the incoming digital audio signal for conversion to an analog audio signal by the Member Device and transmits the digital audio signal to other nearby Member Devices in the mesh network. A Motherboard 32 configured with a Chipset 38 processes the incoming digital audio signal received by Mesh Network Transceiver 34 according to the operating system which, in this example, is programmed onto a Micro SD Card 52 inserted into a Micro SD Slot 40 connected to the Motherboard 32. Mesh Network Transceiver 34 transmits the digital audio signal to a Digital-to-Analog Converter 54 via Motherboard 32 and Chipset 38. Digital-to-Analog Converter 54 converts the digital audio signal to an analog audio signal and outputs the analog audio signal through the Line Out Stereo Audio Jack 56. The Headphones with Audio Cable 62 are connected with Line Out Stereo Audio Jack 56 to enable listening by the individual in possession of the device. The Volume Control Button 46 is connected to Digital-to-Analog Converter 54 and Motherboard 32 in this example to control decibel output at intervals determined by the operating system programmed onto the Micro SD Card 52.

Figure 5:
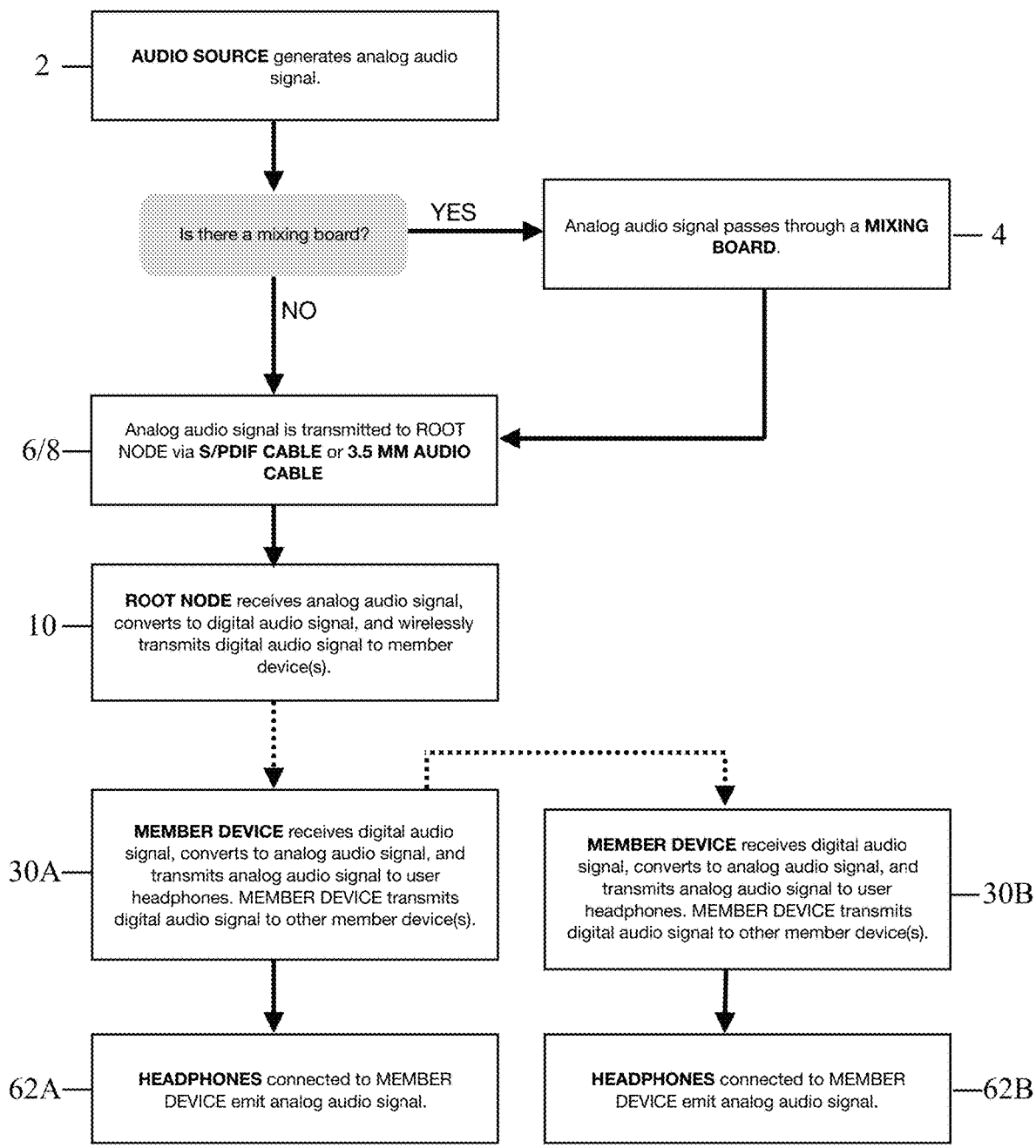
FIG. 5 depicts a flowchart illustrating the flow of wired and wireless connections in the activation and operation of the present invention.

FIG. 5 is a process flow chart illustrating the flow of audio transmission from a single Root Node to multiple Member Device(s) according to an embodiment of the present invention. FIG. 5 includes many of the same components introduced in FIG. 1 and FIG. 3 above. Those components that are unchanged in this embodiment retain their original element numbers and are not reintroduced. In this example the Audio Source 2 connects to the Root Node 10 using the S/PDIF Audio Cable 6 or 3.5 mm Audio Cable 8, either directly or after passing through a Mixing Board 4. The Root Node 10 converts the analog audio signal to a digital audio signal and transmits it wirelessly to member device(s) within range. In this example a Member Device 30A receives the digital audio signal from the root node, converts the incoming digital audio signal to an analog audio signal for listening through a Headphones with Audio Cable 62A, connects with a Member Device 30B, and transmits the digital audio signal to the Member Device 30B. The Member Device 30B receives the digital audio signal from the Member Device 30A and converts the incoming digital audio signal to an analog audio signal for listening through a Headphones with Audio Cable 62B. The digital-to-analog conversion of the audio signal by Member Device(s), connection with other Member Device(s), and transmission of the digital audio signal to other Member Device(s) continues until all Member Device(s) in the mesh network have received the audio signal.

As to a further discussion of the manner of usage and operation of the present invention, the same should be apparent from the above description. Accordingly, no further discussion relating to the manner and usage of operation will be provided.

With respect to the above description, then, it is to be realized that the optimum dimensional relationships for the parts of the invention to include variations in size, materials, shape, form, function, and manner of operation, assembly, and use are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown, described, and accordingly, all suitable modifications and equivalents may be resorted to, falling within the spirit and scope of the invention.

What is claimed is:

1. A method of wirelessly transmitting audio for reducing distortion, echo, latency, and decibel exposure through a mesh network comprising:
   (a) wirelessly transmitting analog source audio to a node device through a wired connection;
   (b) converting incoming analog audio to a digital signal within the root node device;
   (c) using Bluetooth® low energy to construct a Bluetooth® mesh network:
   (d) engaging said mesh network's transceiver circuitry in the root node device to establish a connection with member device(s) in the mesh network which are not yet receiving the digital audio signal;
   (e) engaging said mesh network's transceiver circuitry in the root node device to transmit the digital audio signal from the root node device to member device(s) simultaneously via the established connection;
   (f) engaging the mesh network's transceiver circuitry in the member device(s) to receive the incoming digital audio signal from the root node device simultaneously via the established connection;
   (g) engaging the digital-to-analog circuitry in the member device(s) to convert the incoming digital audio signal to an analog audio signal;
   (h) outputting the analog audio signal from the member device(s) to headphones connected to the member device(s);
   (i) engaging mesh network transceiver circuitry in the member device(s) to establish a wireless connection with other member device(s) simultaneously in the mesh network which are not yet receiving the digital audio signal; and
   (j) engaging the mesh network transceiver circuitry in the member device(s) to transmit the digital audio signal to other member device(s) simultaneously via the established connection.

2. The method of wireless audio transmission of claim 1, wherein said step (a) further includes more than one root node connected to the source audio.

3. The method of wireless audio transmission of claim 1, wherein said step (d) further includes a validation of member device(s) before joining the mesh network and connecting to the root node.

4. The method of wireless audio transmission of claim 1, wherein said step (e) further includes more than one member device intentionally positioned in the venue within range of the root node.

5. The method of wireless audio transmission of claim 1, wherein said step (i) further includes a validation of member device(s) before joining the mesh network and connecting to the transmitting member device.

* * * * *